United States Patent
Chan

(10) Patent No.: US 10,430,358 B2
(45) Date of Patent: Oct. 1, 2019

(54) HIGH-DEFINITION MULTIMEDIA INTERFACE APPARATUS CAPABLE OF COMMUNICATION WITH SLAVE/MASTER APPARATUS UTILIZING THE SAME HDMI PORT AND METHOD FOR CONTROLLING THE SAME

(71) Applicant: MITAC COMPUTING TECHNOLOGY CORPORATION, Taoyuan (TW)

(72) Inventor: Kuo-Hua Chan, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 215 days.

(21) Appl. No.: 15/474,516

(22) Filed: Mar. 30, 2017

(65) Prior Publication Data
US 2018/0285297 A1   Oct. 4, 2018

(51) Int. Cl.
   *G06F 13/40*    (2006.01)
   *G06F 13/364*   (2006.01)
   *G06F 13/42*    (2006.01)

(52) U.S. Cl.
   CPC ........ *G06F 13/364* (2013.01); *G06F 13/4022* (2013.01); *G06F 13/4282* (2013.01)

(58) Field of Classification Search
   None
   See application file for complete search history.

(56) References Cited

U.S. PATENT DOCUMENTS

| | | | |
|---|---|---|---|
| 2016/0118017 A1 | 4/2016 | Huang et al. | |
| 2016/0219226 A1 | 7/2016 | Kuo | |
| 2017/0064383 A1* | 3/2017 | Yu | H04N 21/4316 |
| 2017/0288894 A1* | 10/2017 | Marino | H04L 12/283 |

FOREIGN PATENT DOCUMENTS

| TW | 201423412 A | 6/2014 |
|---|---|---|
| TW | 201510851 A | 3/2015 |

OTHER PUBLICATIONS

Taiwan Patent Office, Office Action, Patent Application Serial No. TW105132111, dated Jun. 9, 2017, Taiwan.

* cited by examiner

*Primary Examiner* — Scott C Sun
(74) *Attorney, Agent, or Firm* — Rabin & Berdo, P.C.

(57) ABSTRACT

An HDMI apparatus and a method for controlling the same are provided. The HDMI apparatus includes an HDMI connection port, a control circuit, a master circuit, a slave circuit, and a switch circuit. The master circuit and the slave circuit are respectively configured to generate a master HDMI output signal and a slave HDMI output signal. The switch circuit is selectively conducted in a first conductive state and a second conductive state according to a control signal generated by the control circuit. In the first conductive state, the switch circuit is electrically connected to the master circuit, so that the master HDMI output signal is output through the HDMI connection port. In the second conductive state, the switch circuit is electrically connected to the slave circuit, so that the slave HDMI output signal is output through the HDMI connection port.

17 Claims, 6 Drawing Sheets

HIGH-DEFINITION MULTIMEDIA INTERFACE APPARATUS CAPABLE OF COMMUNICATION WITH SLAVE/MASTER APPARATUS UTILIZING THE SAME HDMI PORT AND METHOD FOR CONTROLLING THE SAME

BACKGROUND

Technical Field

The present disclosure relates to an electronic apparatus, and in particular, to an electronic apparatus supporting a high-definition multimedia interface technology.

Related Art

In recent years, with popularity of a high-definition multimedia interface (HDMI) technology, most electronic apparatuses are equipped with HDMI connection ports, for example, data-source-end apparatuses such as a game console, a DVD, a personal computer, and a notebook computer, or data-source-playback apparatuses such as display devices of a TV, a projection machine, and a computer. Only an HDMI transmission line between a data-source-end apparatus and a data-source-playback apparatus is needed to output an HDMI signal including audio data and video data from the data-source-end apparatus to the data-source-playback apparatus. For example, a personal computer may output a to-be-display image and audio to a TV for playing.

However, in the conventional HDMI technology, a data-source-end apparatus generally does not support a function of playing data output by another data-source-end apparatus, and a data-source-playback apparatus does not support a function of outputting data. If simultaneously supporting two functions of outputting data and receiving and playing data, an electronic apparatus needs to be added with an HDMI connection port. One HDMI connection port is configured to receive an HDMI signal from another data-source-end apparatus, and another HDMI connection port is configured to output data to another data-source-playback apparatus, thereby causing an increase in the number of communications ports that the electronic apparatus needs to accommodate and the volume of the electronic apparatus. If trying to avoid increasing the number of communications ports, it needs to increase the number of other communications ports in the design, for example, a USB connection port. Moreover, using an additional HDMI connection port also increases production costs. In addition, when an electronic apparatus includes two HDMI connection ports, the user needs to identify which of the two HDMI connection ports is a data-source output port and which is a data-source receiving port by using identifiers beside the HDMI connection ports. If identification fails, the HDMI transmission line is connected to an incorrect connection port. Consequently, a data-source-playback apparatus cannot normally play data, thereby causing inconvenience to the user.

SUMMARY

In view of this, the present disclosure provides a high-definition multimedia interface apparatus capable of communicating with a slave/master apparatus utilizing the same HDMI port and a method for controlling the same.

In an embodiment, a high-definition multimedia interface apparatus includes a high-definition multimedia interface connection port, a control circuit, a master circuit, a slave circuit, and a switch circuit. The control circuit is configured to generate a control signal; the master circuit is configured to generate a master high-definition multimedia interface output signal; the slave circuit is configured to generate a slave high-definition multimedia interface output signal; and the switch circuit is coupled to the high-definition multimedia interface connection port and the control circuit and configured to be selectively conducted in one of a first conductive state and a second conductive state according to a control signal; when the switch circuit is conducted in the first conductive state, the switch circuit is electrically connected to the master circuit, so that the master high-definition multimedia interface output signal is output through the high-definition multimedia interface connection port; and when the switch circuit is conducted in the second conductive state, the switch circuit is electrically connected to the slave circuit, so that the slave high-definition multimedia interface output signal is output through the high-definition multimedia interface connection port.

In an embodiment, the master circuit is further configured to receive a slave high-definition multimedia interface input signal, and the slave circuit is further configured to receive a master high-definition multimedia interface input signal; when the switch circuit is conducted in the first conductive state, the master circuit receives the slave high-definition multimedia interface input signal through the high-definition multimedia interface connection port; and when the switch circuit is conducted in the second conductive state, the slave circuit receives the master high-definition multimedia interface input signal through the high-definition multimedia interface connection port.

In an embodiment, the master high-definition multimedia interface output signal includes a transition minimized differential signaling output signal and a power output signal, and the master high-definition multimedia interface input signal includes a transition minimized differential signaling input signal and a power input signal; and the slave high-definition multimedia interface input signal includes an extended display identification data input signal and a hot-plug detection input signal, and the slave high-definition multimedia interface output signal includes an extended display identification data output signal and a hot-plug detection output signal.

In an embodiment, the control circuit is coupled to the high-definition multimedia interface connection port; and the switch circuit is preset to be conducted in the first conductive state according to the control signal with a first logic level, when the control circuit receives the power input signal through the high-definition multimedia interface connection port, the control circuit generates the control signal with a second logic level which is different from the first logic level, so that the switch circuit automatically switches from the first conductive state to the second conductive state.

In an embodiment, the control circuit is coupled to the slave circuit; and the switch circuit is preset to be conducted in the first conductive state according to the control signal with a first logic level, when the control circuit receives the extended display identification data output signal through the slave circuit, the control circuit generates a control signal with a second logic level which is different from the first logic level, so that the switch circuit automatically switches from the first conductive state to the second conductive state.

In an embodiment, the master circuit is coupled to the control circuit, the master circuit and the control circuit are respectively a platform controller hub and an embedded controller, and the master circuit receives switched-on power to drive the embedded controller to generate the control signal, so that the switch circuit is conducted in the first conductive state.

In an embodiment, the control circuit is an embedded controller, and the control circuit receives standby power to support operation of the slave circuit and the switch circuit.

In an embodiment, the high-definition multimedia interface apparatus further includes a housing, configured to accommodate the high-definition multimedia interface connection port, the control circuit, the master circuit, the slave circuit, and the switch circuit; a physical button is disposed on the housing and configured to receive a touch to generate a touch signal; and the control circuit generates the corresponding control signal according to the touch signal.

In an embodiment, the high-definition multimedia interface apparatus further includes a display unit accommodated in the housing, where an on screen display menu displayed on the display unit includes a set option of a conductive state of the switch circuit, and the physical button receives the touching to change the set option, so that the control circuit generates the corresponding control signal.

In an embodiment, a method for controlling a high-definition multimedia interface apparatus includes: generating, by a master circuit, a master high-definition multimedia interface output signal; electrically connecting, by a switch circuit which is conducted in a first conductive state according to a control signal from a control circuit, to the master circuit and a high-definition multimedia interface connection port, so that the master high-definition multimedia interface output signal is output through the high-definition multimedia interface connection port; generating, by a slave circuit, a slave high-definition multimedia interface output signal; and electrically connecting, by the switch circuit which is conducted in a second conductive state according to a control signal from a control circuit, to the slave circuit and the high-definition multimedia interface connection port, so that the slave high-definition multimedia interface output signal is output through the high-definition multimedia interface connection port.

In an embodiment, the method for controlling a high-definition multimedia interface apparatus further includes: receiving, by the high-definition multimedia interface connection port, a slave high-definition multimedia interface input signal from a slave-end apparatus; electrically connecting, by the switch circuit which is conducted in the first conductive state, to the master circuit and the high-definition multimedia interface connection port, so that the master circuit receives the slave high-definition multimedia interface input signal through the high-definition multimedia interface connection port; receiving, by the high-definition multimedia interface connection port, a master high-definition multimedia interface input signal from a master-end apparatus; and electrically connecting, by the switch circuit which is conducted in the second conductive state, to the slave circuit and the high-definition multimedia interface connection port, so that the slave circuit receives the master high-definition multimedia interface input signal through the high-definition multimedia interface connection port.

In conclusion, according to an embodiment of a high-definition multimedia interface apparatus and a method for controlling the same of the present disclosure, the HDMI connection port of a high-definition multimedia interface apparatus is capable of connecting to either one of master-end apparatus and slave-end apparatus. In this case, the high-definition multimedia interface apparatus may be used as either one of master end and slave end. Compared with the prior art, only one HDMI connection port is needed, the number of HDMI connection ports does not need to be increased, thereby reducing production costs of a high-definition multimedia interface apparatus. Moreover, a user does not need to identify whether an HDMI connection port is an input port or output port with naked eyes, thereby improving convenience during usage.

DETAILED DESCRIPTION

Figure 1:
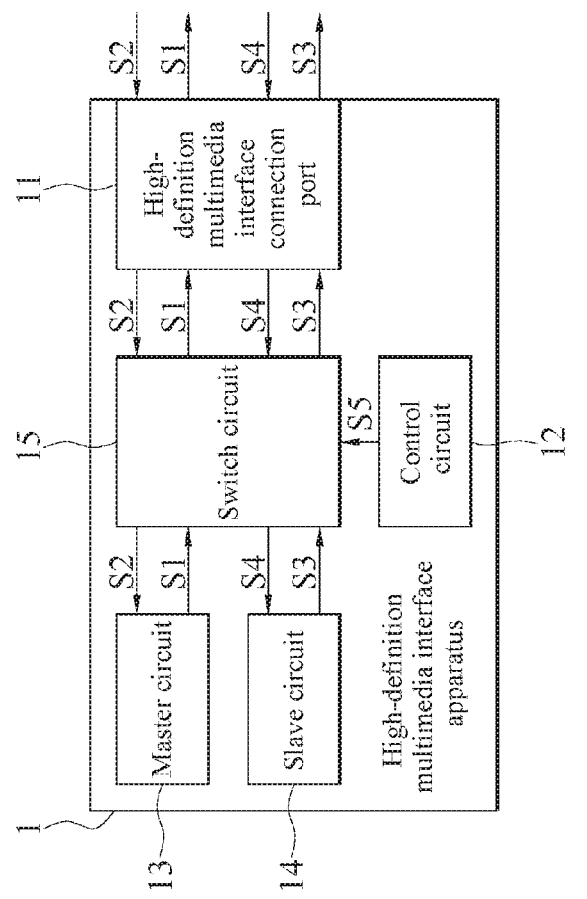
FIG. 1 is a schematic block diagram of an embodiment of a high-definition multimedia interface apparatus according to the present disclosure.

FIG. 1 is a schematic block diagram of a high-definition multimedia interface apparatus according to the present disclosure. Referring to FIG. 1, a high-definition multimedia interface apparatus 1 includes a high-definition multimedia interface connection port 11, a control circuit 12, a master circuit 13, a slave circuit 14, and a switch circuit 15. The switch circuit 15 is coupled to the high-definition multimedia interface connection port 11 and the control circuit 12, and the switch circuit 15 is selectively coupled to the master circuit 13 and the slave circuit 14. In some implementation manners, the switch circuit 15 may be an electronic switch. For example, the switch circuit 15 may be implemented by using multiple metal-oxide semiconductor field-effect tubes (MOSFET).

The high-definition multimedia interface apparatus 1 may perform HDMI communication with another electronic apparatus having an HDMI connection port. The master circuit 13 is configured to generate a master HDMI output signal S1 and receive a slave HDMI input signal S2 from one of the foregoing electronic apparatuses. The slave circuit 14 is configured to generate a slave HDMI output signal S3 and receive a master HDMI input signal S4 from one of the foregoing electronic apparatuses. Further, as shown in FIG. 1, the switch circuit 15 is controlled by the control circuit 12, the control circuit 12 is configured to generate a control signal S5, the switch circuit 15 receives the control signal S5 generated by the control circuit 12, and the switch circuit 15 may switch between a first conductive state and a second conductive state according to a logic level of the control signal S5. For example, the control signal S5 with a high logic level (that is, logic "1") may enable the switch circuit 15 to be conducted in the first conductive state, and the control signal S5 with a low logic level (that is, logic "0") may enable the switch circuit 15 to be conducted in the second conductive state. For example, the switch circuit 15 includes multiple MOSFETs, and a gate end of each MOSFET is coupled to the control circuit 12, to receive the control signal S5.

Therefore, according to two conductive states of the switch circuit 15, the switch circuit 15 is selectively coupled to the master circuit 13 and the slave circuit 14. When the switch circuit 15 is conducted in the first conductive state, the switch circuit 15 is electrically connected to the master circuit 13. In this case, the high-definition multimedia interface apparatus 1 may be used as a master end, so that the master HDMI output signal S1 generated by the master circuit 13 is output through the high-definition multimedia interface connection port 11, and the high-definition multimedia interface connection port 11 receives the slave HDMI input signal S2 from a slave-end apparatus, so that the master circuit 13 receives the slave HDMI input signal S2 through the high-definition multimedia interface connection port 11. Alternatively, when the switch circuit 15 is conducted in the second conductive state, the switch circuit 15 is electrically connected to the slave circuit 14. In this case, the high-definition multimedia interface apparatus 1 may be used as a slave end, so that the slave HDMI output signal S3 generated by the slave circuit 14 is output through the high-definition multimedia interface connection port 11, and the high-definition multimedia interface connection port 11 receives the master HDMI input signal S4 from a master-end apparatus, so that the slave circuit 14 receives the master HDMI input signal S4 through the high-definition multimedia interface connection port 11.

Figure 2:
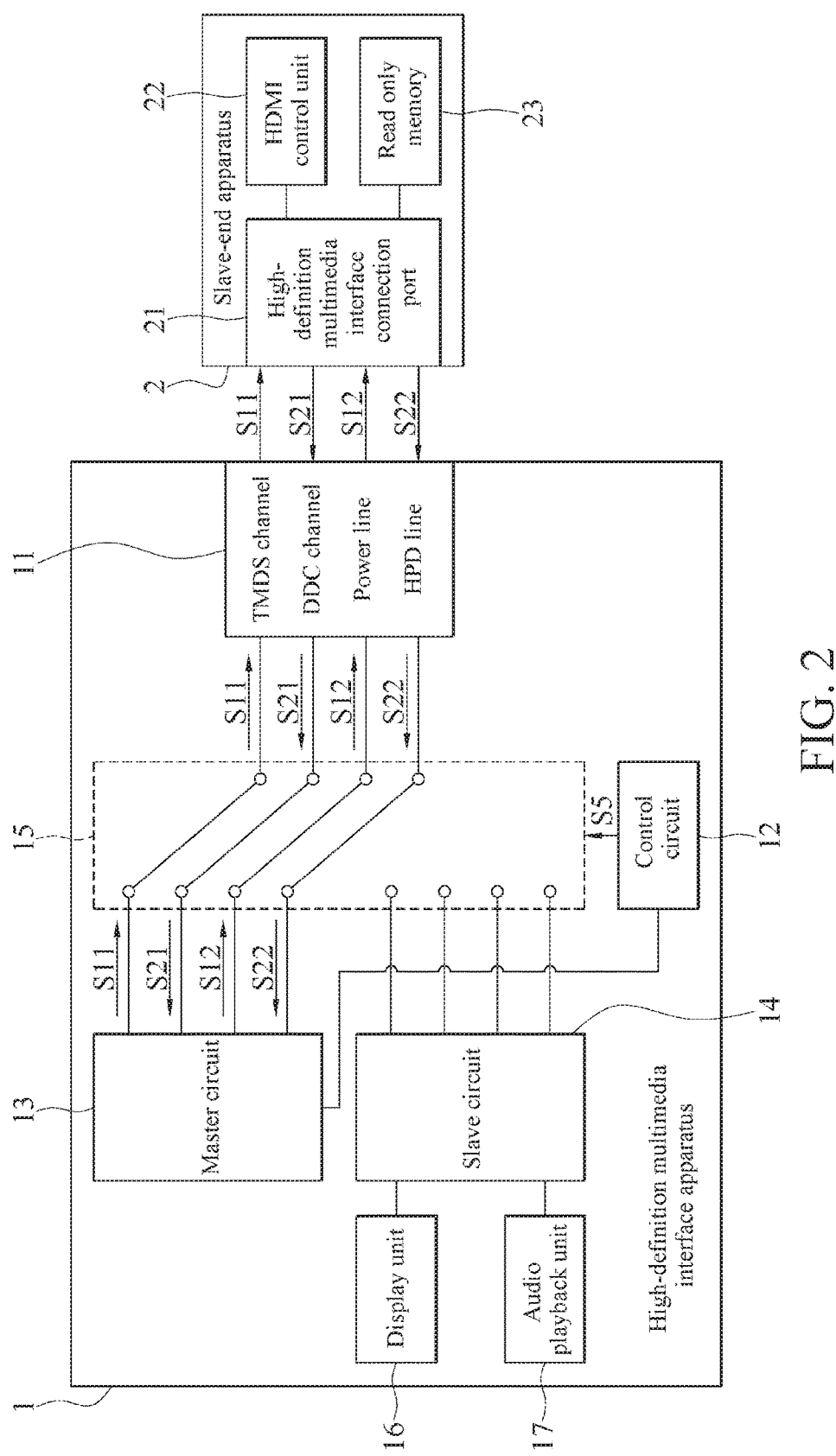
FIG. 2 is a schematic block diagram of a high-definition multimedia interface apparatus 1 in FIG. 1 connecting to a slave-end apparatus 2.
Figure 3:
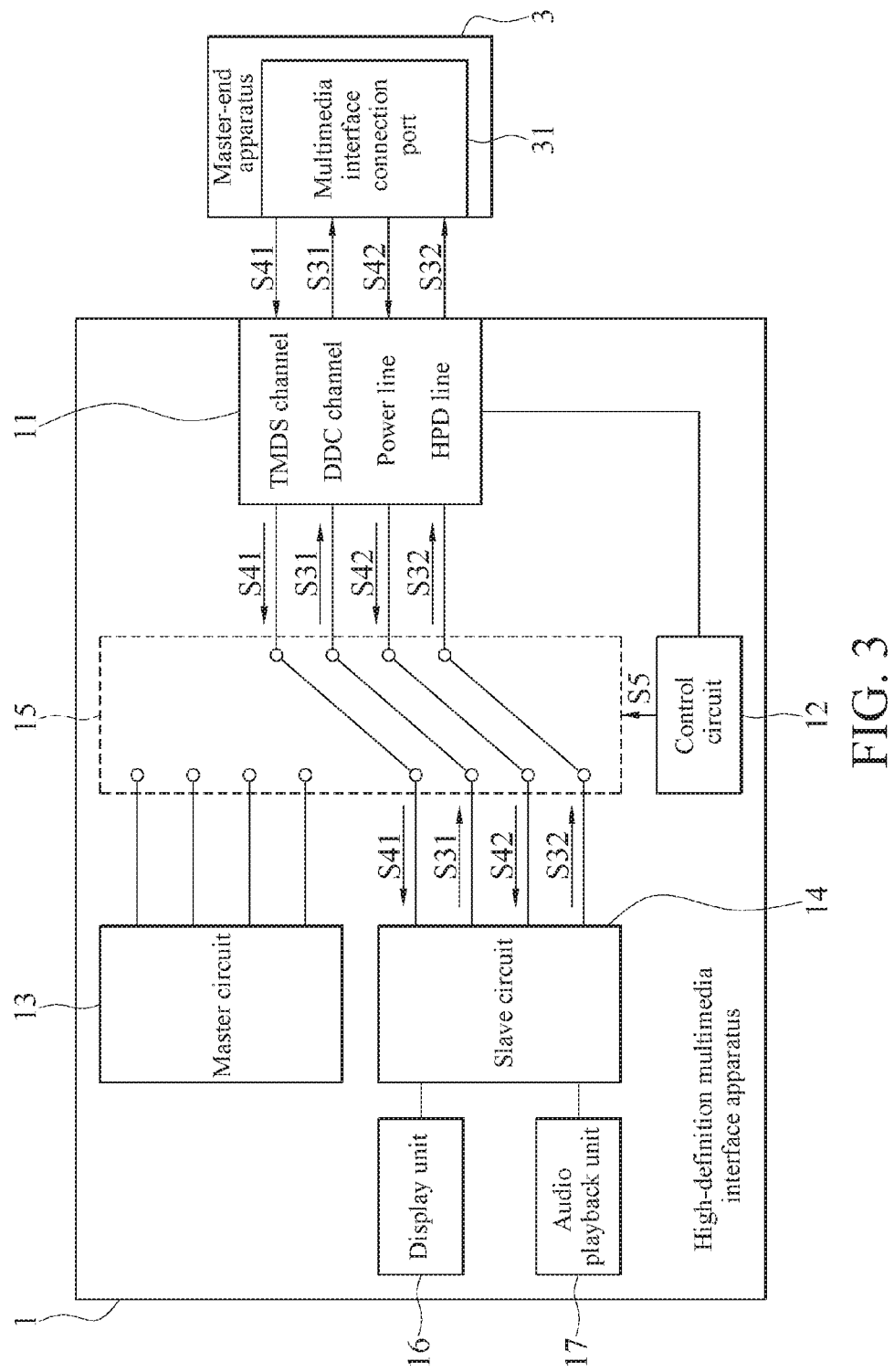
FIG. 3 is a schematic block diagram of an implementation manner of a high-definition multimedia interface apparatus 1 in FIG. 1 connecting to a master-end apparatus 3.
Figure 4:
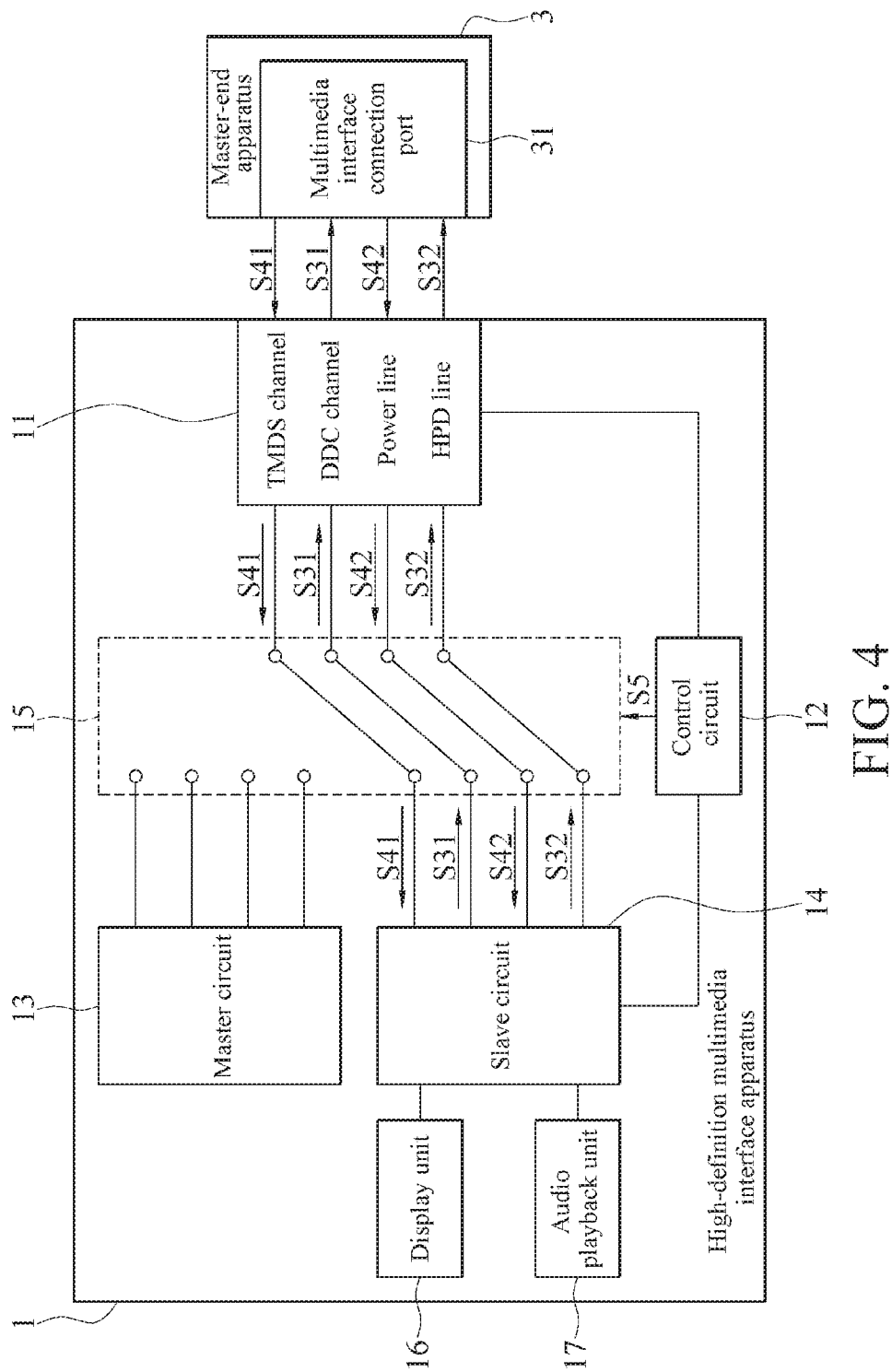
FIG. 4 is a schematic block diagram of another implementation manner of a high-definition multimedia interface apparatus 1 in FIG. 1 connecting to a master-end apparatus 3.

FIG. 2 to FIG. 4 are respectively schematic block diagrams of an embodiment in which the high-definition multimedia interface apparatus 1 in FIG. 1 is used as a master end and a slave end. Referring to FIG. 2 to FIG. 4, it should be noted that the high-definition multimedia interface connection port 11 has a transition minimized differential signaling (TMDS) channel, a display data channel (DDC), a Consumer Electronics Control (CEC) channel, a power line, and a hot-plug detection (HPD) line. The high-definition multimedia interface connection port 11 may be compatible with any existing HDMI interface, for example, an A-type HDMI interface having 19 pins, a B-type HDMI interface having 29 pins, a C-type HDMI interface having 19 pins, and a D-type HDMI interface having 19 pins. A user of the high-definition multimedia interface apparatus 1 may connect one end of a HDMI transmission line of any type to the HDMI connection port 11, and the other end of the HDMI transmission line of any type to a slave-end apparatus 2 or a master-end apparatus 3, to transmit audio and video data in an HDMI format.

Based on this, as shown in FIG. 2, the master circuit 13 may generate the master HDMI output signal S1 including a TMDS output signal S11 and a power output signal S12. The TMDS output signal S11 and the power output signal S12 may be respectively output through a TMDS channel and a power line of the high-definition multimedia interface connection port 11. The master circuit 13 may respectively receive the slave HDMI input signal S2 including an extended display identification data (EDID) input signal S21 and an HPD input signal S22 by using a DDC channel and an HPD line. In addition, as shown in FIG. 3, the slave circuit 14 may generate the slave HDMI output signal S3 including an EDID output signal S31 and an HPD output signal S32. The EDID output signal S31 and the HPD output signal S32 may be respectively output through the DDC channel and the HPD line. The slave circuit 14 may respectively receive the master HDMI input signal S4 including a TMDS input signal S41 and a power input signal S42 by using the TMDS channel and the power line.

For example, the high-definition multimedia interface apparatus 1 is used as a master end. As shown in FIG. 2, the high-definition multimedia interface apparatus 1 is connected to a slave-end apparatus 2. The slave-end apparatus 2 may include a high-definition multimedia interface connection port 21, a HDMI control unit 22, and a ROM 23. After two ends of an HDMI transmission line are respectively connected to the high-definition multimedia interface connection port 11 and the high-definition multimedia interface connection port 21, because the switch circuit 15 is conducted in the first conductive state, channels and lines of the high-definition multimedia interface connection port 11 are electrically connected to the master circuit 13 through the switch circuit 15. Therefore, the power output signal S12 generated by the master circuit 13 may be transmitted to the slave-end apparatus 2 through the switch circuit 15, the high-definition multimedia interface connection port 11, and the high-definition multimedia interface connection port 21, so that an HDMI control unit 22 of the slave-end apparatus 2 and the ROM 23 that stores EDID and that is of the slave-end apparatus 2 respectively output an HPD input signal S22 and an EDID input signal S21 that have logic levels, to respond to the power output signal S12. Then, the master circuit 13 receives the EDID input signal S21 and the HPD input signal S22 through the high-definition multimedia interface connection port 11 and the switch circuit 15. It can be known by the master circuit 13 according to the HPD input signal S22 with the high logic level that the high-definition multimedia interface connection port 11 is already connected to the slave-end apparatus 2. In addition, the master circuit 13 sends the TMDS output signal S11 compatible with the display unit of the slave-end apparatus 2 according to the EDID input signal S21. Finally, the TMDS output signal S11 is transmitted to the slave-end apparatus 2 by using the switch circuit 15, the high-definition multimedia interface connection port 11, and the high-definition multimedia interface connection port 21, so that the slave-end apparatus 2 respectively plays a video and audio.

For example, the high-definition multimedia interface apparatus 1 is used as a slave end. As shown in FIG. 3, the high-definition multimedia interface apparatus 1 is connected to a master-end apparatus 3 including a high-definition multimedia interface connection port 31. The master-end apparatus 3 includes the high-definition multimedia interface connection port 31. After two ends of an HDMI transmission line are respectively connected to the high-definition multimedia interface connection port 11 and the high-definition multimedia interface connection port 31, because the switch circuit 15 is conducted in the second conductive state, channels and lines of the high-definition multimedia interface connection port 11 are electrically connected to the slave circuit 14 by using the switch circuit 15. Therefore, the master-end apparatus 3 may output the power input signal S42 by using the high-definition multimedia interface connection port 31, and the power input signal S42 is transmitted to the slave circuit 14 by using the high-definition multimedia interface connection port 11 and the switch circuit 15, so that the slave circuit 14 respectively outputs an EDID output signal S31 and an HPD output signal S32 with a high logic level, to respond to the power input signal S42. Then, the EDID output signal S31 and the HPD output signal S32 are sent to the master-end apparatus 3 by using the switch circuit 15, the high-definition multimedia interface connection port 11, and the high-definition multimedia interface connection port 31, so that it can be known by the master-end apparatus 3 that the high-definition multimedia interface connection port 31 is already connected to the high-definition multimedia interface apparatus 1. Therefore, the master-end apparatus 3 outputs the TMDS input signal S41 compatible with the display unit 16 of the high-definition multimedia interface apparatus 1 according to the EDID output signal S31. The TMDS input signal S41 is transmitted to the slave circuit 14 by using the multimedia interface connection port 31, the multimedia interface connection port 11, and the switch circuit 15. Finally, the slave circuit 14 performs signal processing on the TMDS input signal S41, to respectively send a video and audio to the display unit 16 and an audio playback unit 17.

Figure 5:
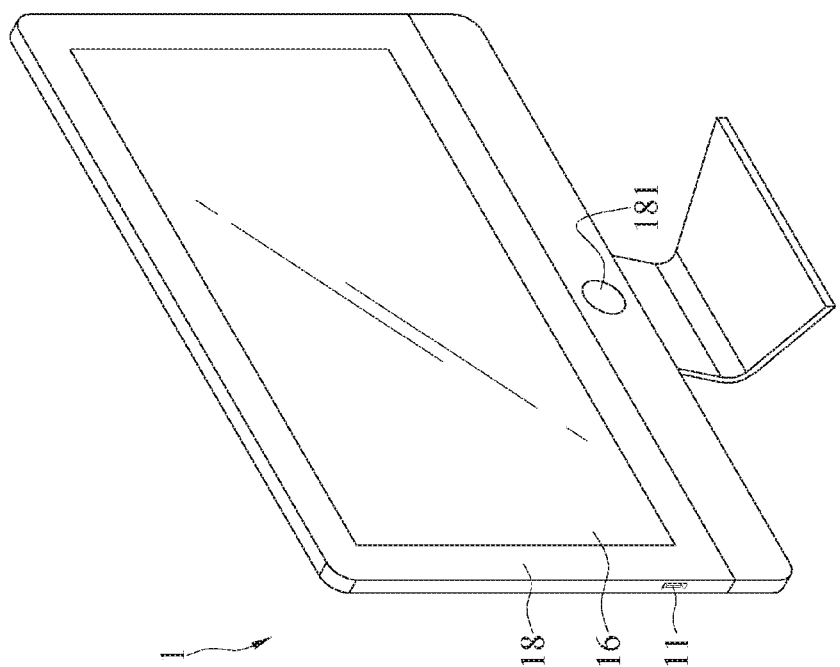
FIG. 5 is a schematic appearance diagram of an embodiment of a high-definition multimedia interface apparatus according to the present disclosure.

In some implementation manners, the high-definition multimedia interface apparatus 1 may be an all-in-one (AIO) computer. As shown in FIG. 5, the high-definition multimedia interface apparatus 1 may further include a housing 18. The housing 18 may accommodate the high-definition multimedia interface connection port 11, the control circuit 12, the master circuit 13, the slave circuit 14, and the switch circuit 15. In this case, the master circuit 13 may be implemented by using a platform controller hub (PCH) of the all-in-one computer, to output a TMDS output signal S11 obtained after integration of a video and audio. The slave circuit 14 may be implemented by using an I/O chip electrically connected to a ROM, a decoder, and a HPD controller. The decoder may support transmission of a low voltage differential signal (LVDS). The decoder performs decoding on a TMDS input signal S41 and separates a video from audio. The ROM stores EDID and may output an EDID output signal S31. After receiving the power input signal S42 whose voltage level is 5 V, the HPD controller may output an HPD output signal S32 with a high logic level. The control circuit 12 may be an embedded controller or any Application Specific Integrated Circuit (ASIC) having a controlling function.

Based on this, in an implementation manner in which the high-definition multimedia interface apparatus 1 is an AIO computer, the high-definition multimedia interface apparatus 1 further includes a power-supply unit. When the high-definition multimedia interface apparatus 1 is powered on, the power-supply unit provides switched-on power. The master circuit 13 receives the switched-on power for operation. Therefore, the high-definition multimedia interface apparatus 1 may be preset as a master end after being powered on. The switch circuit 15 may be automatically conducted in the first conductive state according to the control signal S5. In detail, as shown in FIG. 2, the master circuit 13 is coupled to the control circuit 12, and after being powered on, the master circuit 13 automatically drives the control circuit 12, so that the control circuit 12 transmits the control signal S5 of a corresponding logic level (for example, a high logic level), to control the switch circuit 15 to be conducted in the first conductive state. Further, after the switch circuit 15 is conducted in the first conductive state, the high-definition multimedia interface apparatus 1 in an powered-on state does not automatically switch from a master end to a slave end, that is, when the high-definition multimedia interface apparatus 1 is powered on, the switch circuit 15 does not automatically switch from the first conductive state to the second conductive state. The switch circuit 15 is constantly conducted in the first conductive state, so that the high-definition multimedia interface apparatus 1 may be connected to the slave-end apparatus 2.

Alternatively, when the high-definition multimedia interface apparatus 1 is not powered on or some standby modes in a power option of a basic input/output system (BIOS) are enabled, the power-supply unit may supply standby power. In this case, the control circuit 12 of the embedded controller may receive the standby power from the power-supply unit and transmit the standby power to the slave circuit 14, the switch circuit 15, the audio playback unit 17, and the display unit 16, so that the slave circuit 14, the switch circuit 15, the audio playback unit 17, and the display unit 16 can independently work after receiving the standby power. Therefore, the high-definition multimedia interface apparatus 1 may be used as a slave end, to play a video and audio.

In the implementation manner in which the high-definition multimedia interface apparatus 1 is used as a slave end, when the switch circuit 15 is intended to be automatically conducted in the second conductive state, as shown in FIG. 3, the control circuit 12 may be coupled to the high-definition multimedia interface connection port 11, to be coupled to a power line of the high-definition multimedia interface connection port 11. In addition, the control circuit 12 may include a buffer, to generate the corresponding control signal S5 according to a direction of a power signal and automatically set a conductive state of the switch circuit 15. In detail, when the control circuit 12 detects the received signal by using the buffer, for example, a power input signal S42, comes from the high-definition multimedia interface connection port 11. In this case, it indicates that the high-definition multimedia interface apparatus 1 is used as a slave end. Therefore, the control circuit 12 generates the corresponding control signal S5. An example in which the control signal S5 with a low logic level may enable the switch circuit 15 to be conducted in the second conductive state is used. After detecting the power input signal S42, the control circuit 12 generates the control signal S5 with a low logic level. Based on this, when the switch circuit 15 is preset to be conducted in the first conductive state before the high-definition multimedia interface apparatus 1 is used as a slave end (i.e. the high-definition multimedia interface apparatus 1 may be preset as a master end), the control circuit 12 may generate the control signal S5 with a low logic level according to a power input signal S42 from the master-end apparatus 3, so that the switch circuit 15 automatically switches from the first conductive state to the second conductive state. After the switch circuit 15 is switched to the second conductive state, the high-definition multimedia interface apparatus 1 can normally communicate with the master-end apparatus 3.

Alternatively, in some implementation manners, when the slave circuit 14 does not generate the EDID output signal S31 according to the power input signal S42 but constantly sends the EDID output signal S31, the control circuit 12 may include another buffer, to detect a direction of the EDID signal to generate the corresponding control signal S5. As shown in FIG. 4, the control circuit 12 may be coupled to the slave circuit 14, to receive an EDID signal, for example, an EDID output signal S31, generated by the slave circuit 14. When the control circuit 12 detects that the EDID signal is from the slave circuit 14, it indicates that the high-definition multimedia interface apparatus 1 is used as a slave end. In this case, the control circuit 12 generates the control signal S5 with a low logic level, so that the switch circuit 15 automatically switches to the second conductive state.

In some implementation manners, a user of the high-definition multimedia interface apparatus 1 may also manually set an operation mode of the high-definition multimedia interface apparatus 1, to determine whether the high-definition multimedia interface apparatus 1 is used as a master end or slave end. As shown in FIG. 5, a physical button 181 is disposed on the housing 18 (i.e. the housing 18 further includes the physical button 181) and coupled to the control circuit 12. The physical button 181 receives a touch from the user (i.e. the user touches the physical button 181) to generate a touch signal, to drive the control circuit 12 to generate the control signal S5 to set a conductive state (i.e. the first conductive state or the second conductive state) of the switch circuit 15, so that the high-definition multimedia interface apparatus 1 may be used as a slave end or master end. For example, the physical button 181 may be a button for controlling on screen display (OSD) of the display unit 16. After the user touches the physical button 181, an on screen display menu displayed on the display unit 16 further includes a set option that enables the high-definition multimedia interface apparatus 1 to be used as a slave end or master end. The user may switch the set option set before by using the physical button 181, to drive the control circuit 12 to generate the corresponding control signal S5 and set a conductive state of the switch circuit 15.

Figure 6:
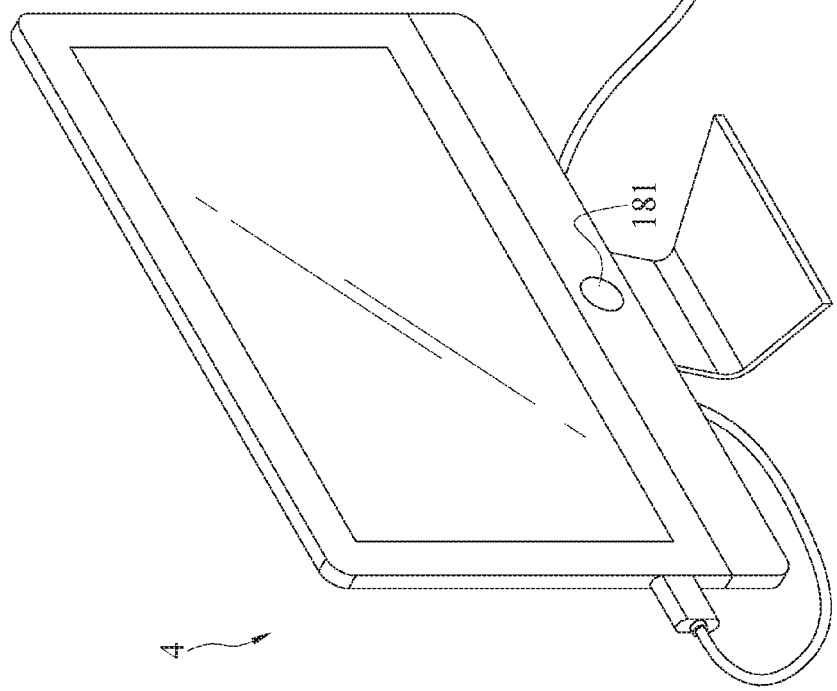
FIG. 6 is a schematic appearance diagram of an embodiment of high-definition multimedia interface apparatuses connecting to each other according to the present disclosure.

FIG. 6 is a schematic appearance diagram of an embodiment of high-definition multimedia interface apparatuses connecting to each other according to the present disclosure. Referring to FIG. 6, an example in which two high-definition multimedia interface apparatuses 4 and 5 are AIO computers is used. When both of the two high-definition multimedia interface apparatuses 4 and 5 are powered on, a user needs to manually set conductive states of switch circuits of the two high-definition multimedia interface apparatuses 4 and 5 separately, or a user may set a conductive state of a switch circuit of either of the two. For example, both of the two high-definition multimedia interface apparatuses 4 and 5 are master ends (that is, switch circuits of the two high-definition multimedia interface apparatuses 4 and 5 are conducted in a first conductive state by default) by default. In this case, the user needs to switch a conductive state of either one of the two switch circuits to a second conductive state by using physical buttons 181 or 182, so that the two high-definition multimedia interface apparatuses 4 and 5 can perform normal HDMI communication with each other.

In conclusion, according to an embodiment of a high-definition multimedia interface apparatus and a method for controlling the same of the present disclosure, an HDMI connection port of a high-definition multimedia interface apparatus may be connected to either one of master-end apparatus and slave-end apparatus. In this case, the high-definition multimedia interface apparatus may be used as either one of master end and slave end. Compared with the prior art, only one HDMI connection port is needed, the number of HDMI connection ports does not need to be increased, thereby reducing production costs of a high-definition multimedia interface apparatus. Moreover, a user does not need to identify whether an HDMI connection port is an input port or output port with naked eyes, thereby improving convenience during usage.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A high-definition multimedia interface apparatus, comprising:
a high-definition multimedia interface connection port;
a control circuit, configured to generate a control signal;
a master circuit, configured to generate a master high-definition multimedia interface output signal, and to receive a slave high-definition multimedia interface input signal;
a slave circuit, configured to generate a slave high-definition multimedia interface output signal, and to receive a master high-definition multimedia interface input signal; and
a switch circuit, coupled to the high-definition multimedia interface connection port and the control circuit and configured to be selectively conducted in one of a first conductive state and a second conductive state according to the control signal; wherein
when the switch circuit is conducted in the first conductive state, the switch circuit is electrically connected to the master circuit, so that the master high-definition multimedia interface output signal is output through the high-definition multimedia interface connection port, and the master circuit receives the slave high-definition multimedia interface input signal through the high-definition multimedia interface connection port;
when the switch circuit is conducted in the second conductive state, the switch circuit is electrically connected to the slave circuit, so that the slave high-definition multimedia interface output signal is output through the high-definition multimedia interface connection port, and the slave circuit receives the master high-definition multimedia interface input signal through the high-definition multimedia interface connection port; and
wherein the master high-definition multimedia interface output signal comprises a transition minimized differential signaling output signal and a power output signal, and the slave high-definition multimedia interface output signal comprises an extended display identification data output signal and a hot-plug detection output signal.

2. The high-definition multimedia interface apparatus according to claim 1, wherein the master high-definition multimedia interface input signal comprises a transition minimized differential signaling input signal and a power input signal, and the slave high-definition multimedia interface input signal comprises an extended display identification data input signal and a hot-plug detection input signal.

3. The high-definition multimedia interface apparatus according to claim 2, wherein the control circuit is coupled to the high-definition multimedia interface connection port; and the switch circuit is preset to be conducted in the first conductive state according to the control signal with a first logic level, when the control circuit receives the power input signal through the high-definition multimedia interface connection port, the control circuit generates the control signal with a second logic level which is different from the first logic level, so that the switch circuit automatically switches from the first conductive state to the second conductive state.

4. The high-definition multimedia interface apparatus according to claim 2, wherein the control circuit is coupled to the slave circuit; and the switch circuit is preset to be conducted in the first conductive state according to the control signal with a first logic level, when the control circuit receives the extended display identification data output signal through the slave circuit, the control circuit generates the control signal with a second logic level which is different from the first logic level, so that the switch circuit automatically switches from the first conductive state to the second conductive state.

5. The high-definition multimedia interface apparatus according to claim 2, wherein the control circuit is an embedded controller, and the control circuit receives standby power to support operation of the slave circuit and the switch circuit.

6. The high-definition multimedia interface apparatus according to claim 1, wherein the master circuit is coupled to the control circuit, the master circuit is a platform controller hub, the control circuit is an embedded controller, and the master circuit receives switched-on power to drive the embedded controller to generate the control signal, so that the switch circuit is conducted in the first conductive state.

7. The high-definition multimedia interface apparatus according to claim 1, further comprising a housing, wherein the housing is configured to accommodate the high-definition multimedia interface connection port, the control circuit, the master circuit, the slave circuit, and the switch circuit; a physical button is disposed on the housing and configured to receive a touch to generate a touch signal; and the control circuit generates the corresponding control signal according to the touch signal.

8. The high-definition multimedia interface apparatus according to claim 7, further comprising a display unit accommodated in the housing, wherein an on screen display menu displayed on the display unit comprises a set option of a conductive state of the switch circuit, and the physical button receives the touching to change the set option, so that the control circuit generates the corresponding control signal.

9. A method for controlling a high-definition multimedia interface apparatus, comprising:
generating, by a master circuit, a master high-definition multimedia interface output signal;
receiving, by the high-definition multimedia interface connection port, a slave high-definition multimedia interface input signal from a slave-end apparatus;
electrically connecting, by a switch circuit which is conducted in a first conductive state according to a control signal from a control circuit, to the master circuit and a high-definition multimedia interface connection port, so that the master high-definition multimedia interface output signal is output through the high-definition multimedia interface connection port, and the master circuit receives the slave high-definition multimedia interface input signal through the high-definition multimedia interface connection port;
generating, by a slave circuit, a slave high-definition multimedia interface output signal;
receiving, by the high-definition multimedia interface connection port, a master high-definition multimedia interface input signal from a master-end apparatus; and
electrically connecting, by the switch circuit which is conducted in a second conductive state according to the control signal, to the slave circuit and the high-definition multimedia interface connection port, so that the slave high-definition multimedia interface output signal is output through the high-definition multimedia interface connection port, and the slave circuit receives the master high-definition multimedia interface input signal through the high-definition multimedia interface connection port.

10. The method for controlling a high-definition multimedia interface apparatus according to claim 9, wherein the step of receiving the slave high-definition multimedia interface input signal comprises receiving an extended display identification data input signal and a hot-plug detection input signal of the slave high-definition multimedia interface input signal through the high-definition multimedia interface connection port; the step of receiving the master high-definition multimedia interface input signal comprises receiving a transition minimized differential signaling input signal and a power input signal of the master high-definition multimedia interface input signal through the high-definition multimedia interface connection port; the step of generating the master high-definition multimedia interface output signal comprises generating a transition minimized differential signaling output signal and a power output signal of the master high-definition multimedia interface output signal through the master circuit; and the step of generating the slave high-definition multimedia interface output signal comprises generating an extended display identification data output signal and a hot-plug detection output signal of the slave high-definition multimedia interface output signal through the slave circuit.

11. The method for controlling a high-definition multimedia interface apparatus according to claim 10, wherein the step of electrically connecting to the master circuit and the high-definition multimedia interface connection port is driving, by the master circuit after being powered on, the control circuit to generate the control signal with a first logic level by default, and the control signal with the first logic level enables the switch circuit to be electrically connected to the master circuit and the high-definition multimedia interface connection port.

12. The method for controlling a high-definition multimedia interface apparatus according to claim 11, wherein the master circuit and the control circuit are respectively a platform controller hub and an embedded controller, and the step of electrically connecting to the master circuit and the high-definition multimedia interface connection port is driving, by the platform controller hub after being powered on, the embedded controller to generate the control signal with the first logic level by default.

13. The method for controlling a high-definition multimedia interface apparatus according to claim 11, wherein the step of electrically connecting to the slave circuit and the high-definition multimedia interface connection port comprises:
detecting, by the control circuit, whether the high-definition multimedia interface connection port receives a power input signal; and
when the high-definition multimedia interface connection port receives the power input signal, generating, by the control circuit, the control signal with a second logic level, wherein the control signal with the second logic level enables the switch circuit to be automatically switched from the first conductive state to the second conductive state.

14. The method for controlling a high-definition multimedia interface apparatus according to claim 13, wherein the control circuit is an embedded controller, and the method for controlling the same further comprises receiving, by the embedded controller, standby power to support operation of the slave circuit and the switch circuit.

15. The method for controlling a high-definition multimedia interface apparatus according to claim 11, wherein the step of electrically connecting to the slave circuit and the high-definition multimedia interface connection port comprises:
detecting, by the control circuit, whether the high-definition multimedia interface connection port receives an extended display identification data output signal; and when the high-definition multimedia interface connection port receives the extended display identification data output signal, generating, by the control circuit, the control signal with a second logic level, wherein the control signal with the second logic level enables the switch circuit to be automatically switched from the first conductive state to the second conductive state.

16. The method for controlling a high-definition multimedia interface apparatus according to claim 9, wherein the switch circuit is selectively electrically connected to the master circuit or the slave circuit according to the control signal, and the method for controlling the same further comprises:

receiving a touch to generate a touch signal by a physical button disposed on a housing, wherein the housing accommodates the high-definition multimedia interface connection port, the control circuit, the master circuit, the slave circuit, and the switch circuit; and generating, by the control circuit, the control signal according to the touch signal.

17. The method for controlling a high-definition multimedia interface apparatus according to claim 16, wherein the method for controlling the same further comprises displaying, by a display unit accommodated in the housing, an on screen display menu, and the on screen display menu comprises a set option that the switch circuit is electrically connected to the master circuit or the slave circuit; and in the step of generating the touch signal, the physical button generates the control signal corresponding to the set option, so that the control circuit generates the control signal corresponding to the set option in the step of generating the control signal according to the touch signal.

* * * * *